United States Patent
Chen

(10) Patent No.: US 7,567,640 B2
(45) Date of Patent: Jul. 28, 2009

(54) PHASE OFFSET TRACKING METHOD FOR TRACKING A PHASE OFFSET AND DEVICE THEREOF

(75) Inventor: You-Duan Chen, Hsinchuang (TW)

(73) Assignee: Faraday Technology Corp., Hsin-Chu (TW)

( * ) Notice: Subject to any disclaimer, the term of this patent is extended or adjusted under 35 U.S.C. 154(b) by 574 days.

(21) Appl. No.: 11/381,137

(22) Filed: May 2, 2006

(65) Prior Publication Data

US 2007/0258524 A1    Nov. 8, 2007

(51) Int. Cl.
*H04L 7/00* (2006.01)

(52) U.S. Cl. .................. 375/371; 375/149; 375/344; 375/375; 327/155; 370/516

(58) Field of Classification Search .............. 375/145, 375/149, 344, 354, 371, 373, 375, 376; 327/141, 327/155, 156, 159, 163; 370/503, 516
See application file for complete search history.

(56) References Cited

U.S. PATENT DOCUMENTS

| | | | |
|---|---|---|---|
| 6,862,262 B1 * | 3/2005 | Imamura | 370/210 |
| 7,203,261 B2 * | 4/2007 | Gupta | 375/376 |
| 7,397,758 B1 * | 7/2008 | Hart et al. | 370/208 |
| 7,453,792 B2 * | 11/2008 | Chadha et al. | 370/203 |
| 2004/0161047 A1 * | 8/2004 | Liu et al. | |

* cited by examiner

*Primary Examiner*—Dac V Ha
(74) *Attorney, Agent, or Firm*—Winston Hsu

(57) ABSTRACT

The invention relates to a phase offset tracking module and method for tracking a phase offset, and in particular, to a phase offset tracking module and method for tracking a phase offset in a receiver. A phase offset tracking method comprises: utilizing a first and a second registers to respectively store a first and a second register values; estimating an error phase according to an input phase and an output phase; setting the first register value to an unit phase error initially; setting the second register value according to the first register value; filtering the error phase to generate a filtered signal according to the first register value; accumulating the filtered signal continuously according to the second register value to generate the output phase; and compensating the phase offset in each input symbol according to the output phase.

5 Claims, 9 Drawing Sheets

| TFC Number | Base Sequence/Preamble | BAND_ID ($n_b$) for TFC | | | | | | |
|---|---|---|---|---|---|---|---|---|
| 1 | 1 | 1 | 2 | 3 | 1 | 2 | 3 |
| 2 | 2 | 1 | 3 | 2 | 1 | 3 | 2 |
| 3 | 3 | 1 | 1 | 2 | 2 | 3 | 3 |
| 4 | 4 | 1 | 1 | 3 | 3 | 2 | 2 |
| 5 | 5 | 1 | 1 | 1 | 1 | 1 | 1 |
| 6 | 6 | 2 | 2 | 2 | 2 | 2 | 2 |
| 7 | 7 | 3 | 3 | 3 | 3 | 3 | 3 |

FIG. 4A

PHASE OFFSET TRACKING METHOD FOR TRACKING A PHASE OFFSET AND DEVICE THEREOF

BACKGROUND OF THE INVENTION

1. Field of the Invention

The invention relates to a phase offset tracking module and method for tracking the phase offset caused by residual frequency offset in OFDM based transmission systems, and in particular, to a phase offset tracking module and method for tracking a phase offset in a receiver.

2. Description of the Related Art

In a related receiver, the phase offset tracking module (e.g. digital phase lock loop (DPLL)) is utilized to track a phase offset in each received symbol, especially in an Orthogonal Frequency Division Multiplexing (OFDM) receiver. The phase offset tracking module, however, may take a long convergence time and degrade performance for initial symbols during acquisition stage. Additionally, the related DPLL can not be applied directly in some receivers (e.g. Multi-band Orthogonal Frequency Division Multiplexing (MB-OFDM) receiver).

BRIEF SUMMARY OF INVENTION

A detailed description is given in the following embodiments with reference to the accompanying drawings.

An object of the invention is to provide a phase offset tracking method for tracking a phase offset in an Orthogonal Frequency Division Multiplexing receiver. The OFDM receiver receives various kinds of input symbols and compensates a phase offset in each symbol. Each input symbol comprises an input phase offset. The phase offset tracking method comprises: utilizing a first(loop) and a second(accumulate) registers to respectively store a first and a second register values; estimating an error phase according to a phase compensated OFDM symbol and its associated pilots; setting the first and second register values initially according to the value of estimated error phase of a first symbol; after these initial settings, the following operations are the same as traditional DPLL, filtering the estimated error phase to generate a filtered signal according to the first register value; accumulating the filtered signal continuously according to the second register value to generate the output phase; and compensating the phase offset in each input symbol according to the output phase.

Another object of the invention is to provide a phase offset tracking method for tracking a phase offset in a Multi-band Orthogonal Frequency Division Multiplexing receiver. The phase offset tracking method comprises: utilizing different loop and accumulate registers to respectively store different first and second register values in different bands; estimating an error phase according to an OFDM symbol and its associated pilots; setting different first and second register values initially according to the estimated error phases of a first symbol in different bands; filtering the estimated error phase to generate a filtered signal according to the first register value of a current band; accumulating the filtered signal continuously according to the second register value of the current band to generate the output phase; and compensating the phase offset in each input symbol of the current band according to the output phase.

BRIEF DESCRIPTION OF DRAWINGS

The present invention can be more fully understood by reading the subsequent detailed description and examples with references made to the accompanying drawings, wherein:

FIG. 4A shows different TFC numbers representing different frequency hopping sequences;

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
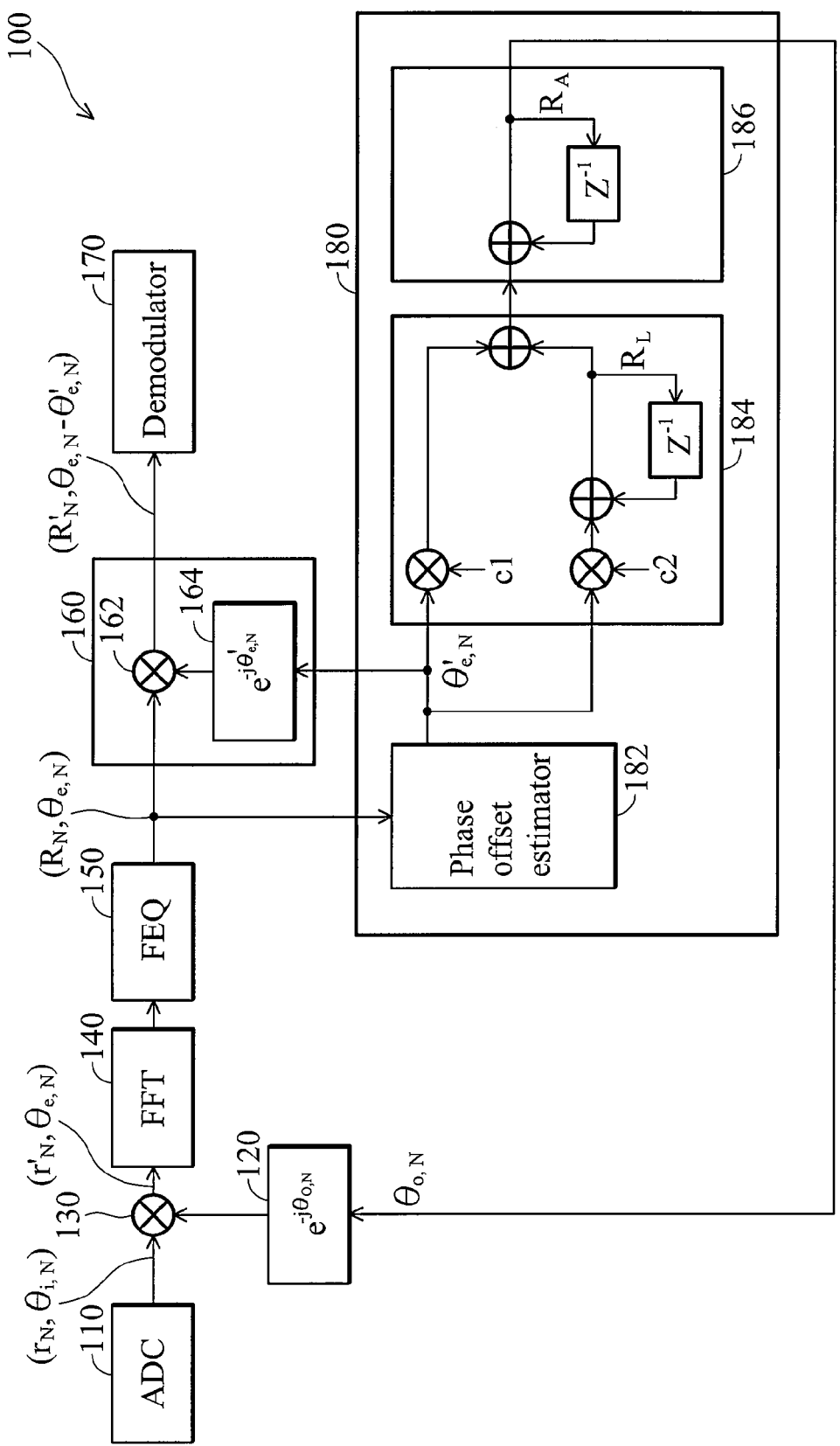
FIG. 1 shows a block diagram of an OFDM receiver according to a first embodiment of the invention.

Please refer to FIG. 1. FIG. 1 shows a block diagram of an OFDM receiver 100 according to a first embodiment of the invention. The OFDM receiver 100 comprises an analog-to-digital converter (ADC) 110, a look up table (LUT) 120 to transform the compensated output phase $\theta_{o,N}$ to its corresponding sine and cosine values, a complex multiplier 130, a Fast Fourier Transform (FFT) module 140, a frequency-domain equalizer (FEQ) 150, a directed phase offset symbol compensator 160, a demodulator 170, and a phase offset tracking module 180. The ADC 110 converts analog packets to digital packets. The multiplier 130 multiples a digital packet (comprising a plurality of input symbols, $r_N$ is the Nth input symbol and $\theta_{i,N}$ is the input phase offset corresponding to $r_N$ and naturally, $\theta_{i,N}$ is equal to $\theta_{i-1,N}$ plus $\Delta$, where $\Delta$ is the unit phase offset) by a compensating signal (wherein, the phase of the compensating signal is called the output phase $\theta_{o,N}$ corresponding to the Nth symbol $r_N$) from the LUT 120 to obtain a phase offset compensated signal ($r'_N$ is the Nth compensated symbol and $\theta_{e,N}$ is equal to $\theta_{i,N}$ minus $\theta_{o,N}$ is the residual error phase corresponding to $r'_N$). The FFT module 140 and the FEQ 150 transfers and equalizes the phase offset compensated signal to generate the frequency-domain signal ($R_N$ is the Nth frequency-domain symbol and $\theta_{e,N}$ is the residual error phase of $R_N$). A detailed description of elements 140, 150, 170 (familiar to those skilled in the art) is omitted and the element 160 will be described later (with FIG. 3). The phase offset tracking module 180 outputs a phase offset output signal (utilized to generate the compensated signal, $\theta_{o,N}$ is the output phase of the Nth symbol) according to a plurality of error phases ($\theta_{e',N}$ is the Nth estimated error phase extracted from the element 182). A detailed description of the phase offset tracking module 180 is provided in the following.

Figure 2:
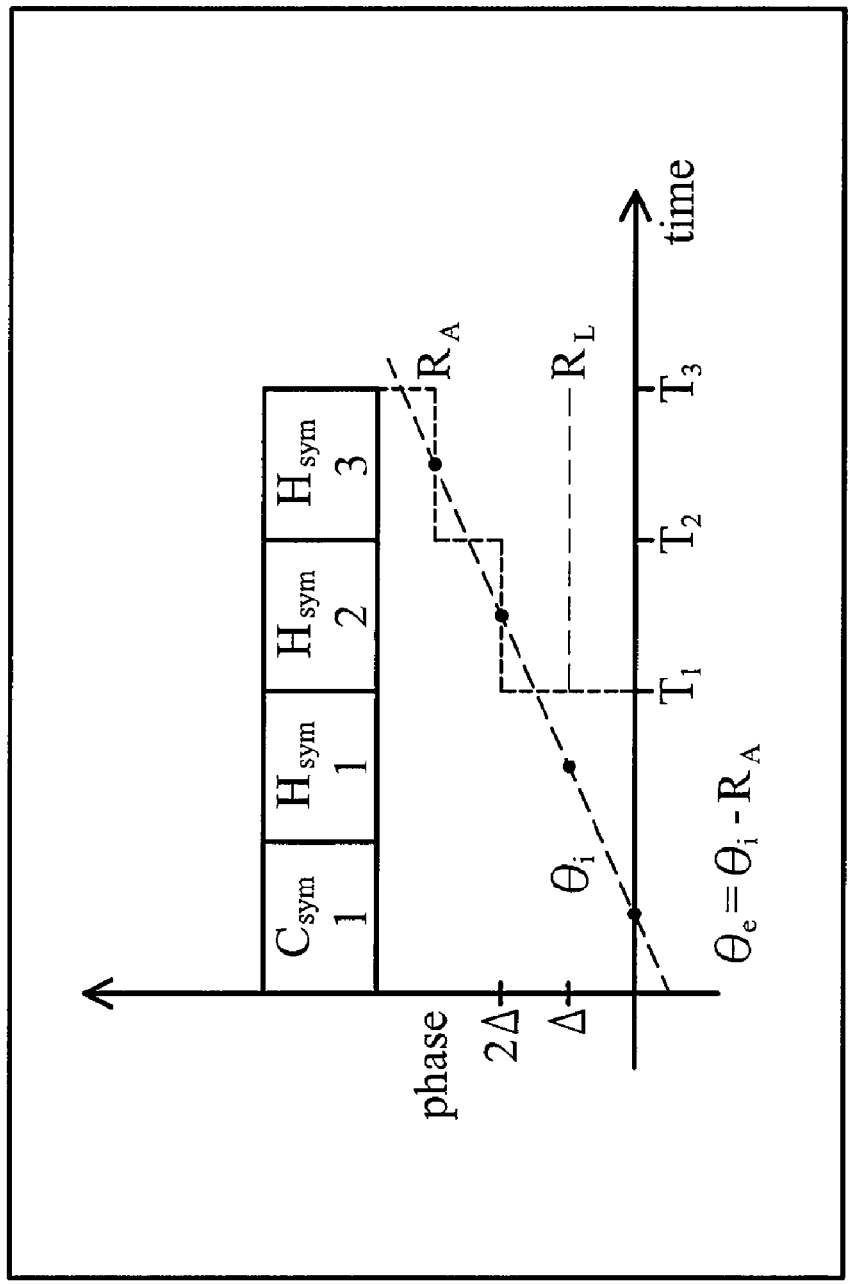
FIG. 2 shows a timing diagram of register values $R_A$ (accumulate register) and $R_L$ (loop register) in the phase offset tracking module, and the phase offset input phase $\theta_i$, of each symbol according to a first embodiment.

FIG. 2 shows a timing diagram of register values $R_A$ and $R_L$ in the phase offset tracking module 180, and the phase offset input phase $\theta_i$, of each symbol according to a first embodiment. The phase offset tracking module 180 is a modified digital phase lock loop (DPLL) utilized to track the phase offset of each OFDM symbol comprising a phase offset estimator 182, a loop filter 184, and an accumulator 186. The phase offset estimator 182 estimates the error phase $\theta_e$ corresponding to each symbol. The accumulator 186 accumulates input data continuously to generate the output phase $\theta_o$ corresponding to each symbol to compensate the phase offset of each input symbol in the digital packet (FIG. 1). Please refer to FIG. 2. Where Csym represents channel estimation symbols and Hsym represents Header symbols. At time $T_1$, in ideal case, after Hsym1 has been processed, we can get the estimated phase error $\theta_{e',T1}$ at the value of the unit phase-error $\Delta$ ($\theta_{e',T1}=\theta_{e,T1}=\theta_{i1}-0=\Delta$), then the register value $R_L$ utilized in the loop filter 184 is set to the unit phase error $\Delta$ and the register value $R_A$ utilized in the accumulator 186 is set to $2\Delta$ by force after the first coming header symbol Hsym_1 has been processed. At time $T_2$, after Hsym2 has been processed, we can estimate the phase error $\theta_{e,T2}$ at the value of zero ($\theta_{e',T2}=\theta_{e,T2}=\theta_{i,T2}-R_{A,T1}=2\Delta-2\Delta=0$), so the register value $R_A$ is equal to $3\Delta$ ($R_{A,T2}=R_{A,T1}+R_{L,T1}+\theta_{e',T2}\times(c1+c2)=2\Delta+\Delta+0\times(c1+c2)=3\Delta$) after the second coming header symbol Hsym_2 has been processed. At time $T_3$, the register value $R_A$ is equal to $4\Delta$ after the second coming header symbol Hsym_3 has been processed. Compared with the related art, the convergence time of the phase offset tracking module 180 is shorter to only one symbol duration due to the forced setting of the register value $R_L$ and $R_A$ at time $T_1$ (in stable condition, $R_{L,N}=\Delta$, $\theta_{e',N=0}$, $R_{A,N}=R_{A,N-1}+\Delta$). In a traditional DPLL, the register values $R_L$ equals to the value $C1\times\Delta$ and $R_A$ equals to the value $C2\times\Delta$ at time $T_1$ and hence require longer convergence time.

Figure 3:
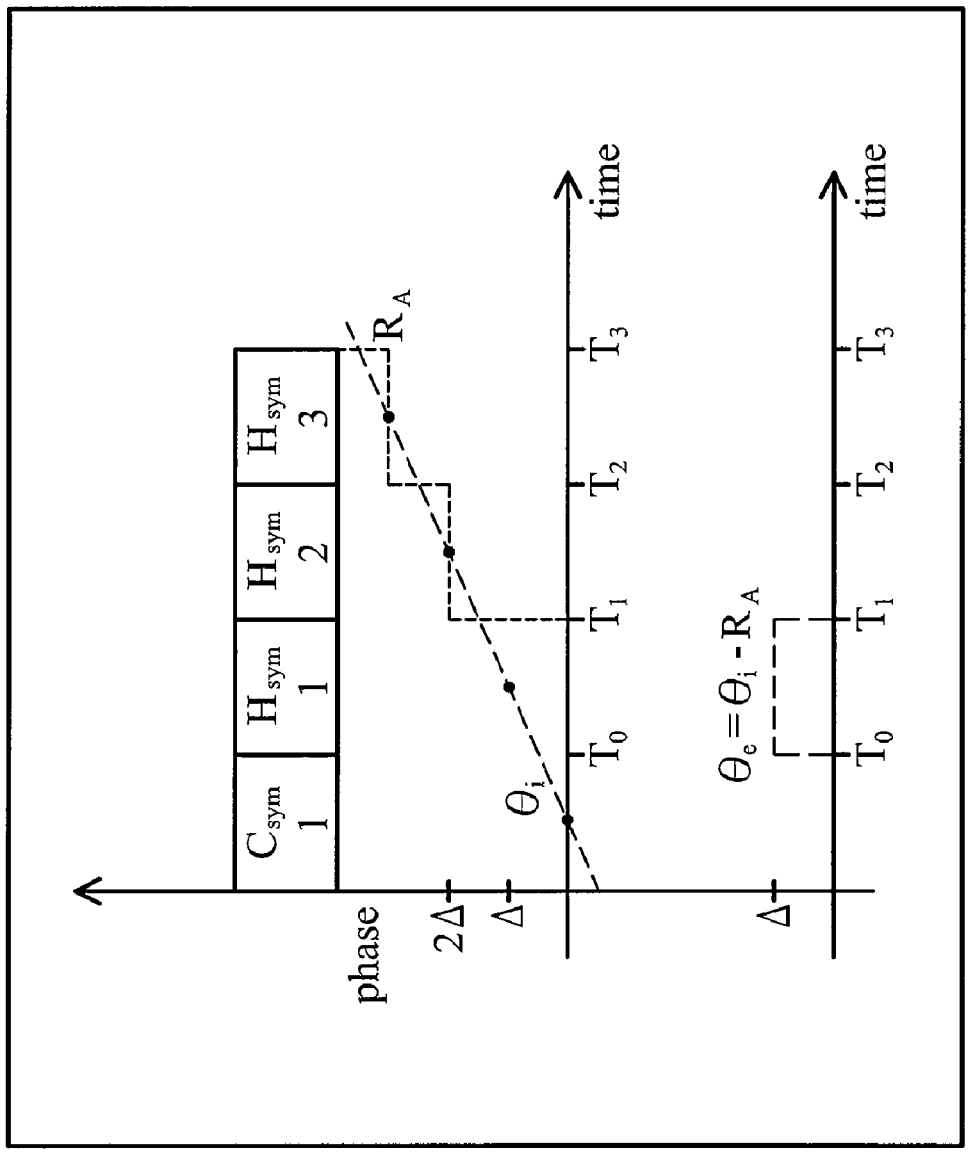
FIG. 3 shows another timing diagram of register values $R_A$ and $R_L$ in the phase offset tracking module, and the residual error phase $\theta_e$ of each symbol according to a second embodiment.

Please refer to FIG. 3. FIG. 3 shows another timing diagram of register values $R_A$ and $R_L$ in the phase offset tracking module 180, and the phase offset input phase $\theta_i$ of each symbol according to a second embodiment. In the duration $T_0 \sim T_1$, the inaccuracy of residual phase offset ($\theta_{e,T1}=\theta_{i1}-0=\Delta$) may degrade the performance since the operation of the DPLL is not in stable condition and the first coming header symbol (Hsym_1) must be further compensated. The phase offset estimator 182 gets an estimated error phase $\theta_{e',T1}$ of the first incoming header symbol (Hsym_1) and the multiplier 162 multiples the first coming header symbol by the estimated error phase $\theta_{e',1}$ from the transformer 164 to further compensate the first coming header symbol, and for performance purpose, we can extend the direct phase compensation time to further more symbols to prevent the performance degrade due to the residual phase error in non-convergence symbols. Compared with the phase offset tracking module 180 in the first embodiment, the key difference is that the phase offset tracking module 180 in this embodiment further compensates the initial coming header symbols. The above-mentioned phase offset tracking modules (in the first and second embodiments) are utilized in the OFDM receiver.

Some phase offset tracking modules utilized in another MB-OFDM receiver are provided in the following.

Figure 4B:
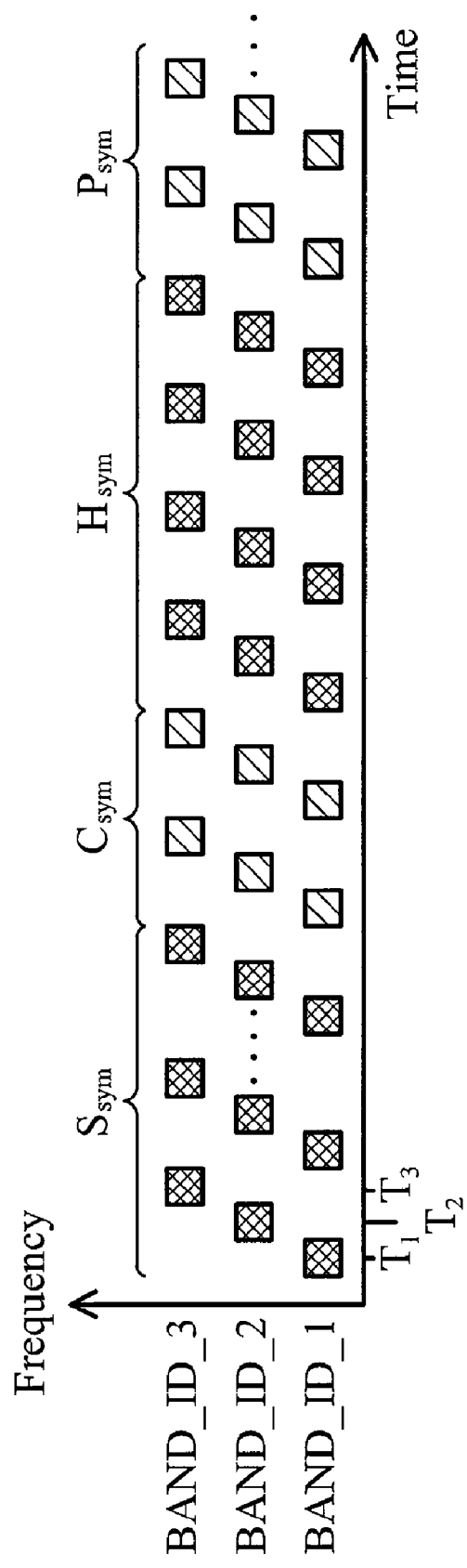
FIG. 4B shows a timing diagram of a received packet.

The Multi-band Orthogonal Frequency Division Multiplexing (MB-OFDM) technology is a next generation OFDM technology (e.g. IEEE 802.15 for MB-OFDM or IEEE 802.11n for next generation WLAN), in which the carrier frequency always varies (hops) with time. The band hopping sequence is determined according to a current time-frequency code (TFC) number in a packet. Please refer to FIGS. 4A and 4B at the same time. FIG. 4A shows different TFC numbers representing different frequency hopping sequences. For example, if the TFC number is 1, the band hopping sequence is BAND_ID_1, BAND_ID_2, and BAND_ID_3; if the TFC number is 2, the band hopping sequence is BAND_ID_1, BAND_ID_3, and BAND_ID_2. Please refer to FIG. 4B. FIG. 4B shows a timing diagram of a received packet, in which the TFC number is equal to 1. The packet comprises a plurality of synchronization symbols $S_{sym}$, a plurality of channel estimation symbols $C_{sym}$, a plurality of header symbols $H_{sym}$, and a plurality of payload symbols $P_{sym}$. At time $T_1$, the carrier frequency of the symbol falls in the band BAND_ID_1; at time $T_2$, the carrier frequency of the symbol hops to another band BAND_ID_2; at time $T_3$, the carrier frequency of the symbol hops to another BAND_ID_3. The hopping process will be repeated again and again according to the specific hopping sequence. MB-OFDM is an efficient multi-channel modulation technology; however, the phase offset of each symbol may accumulate and decrease performance. Hence a method for compensating phase offset is desirable.

Figure 5:
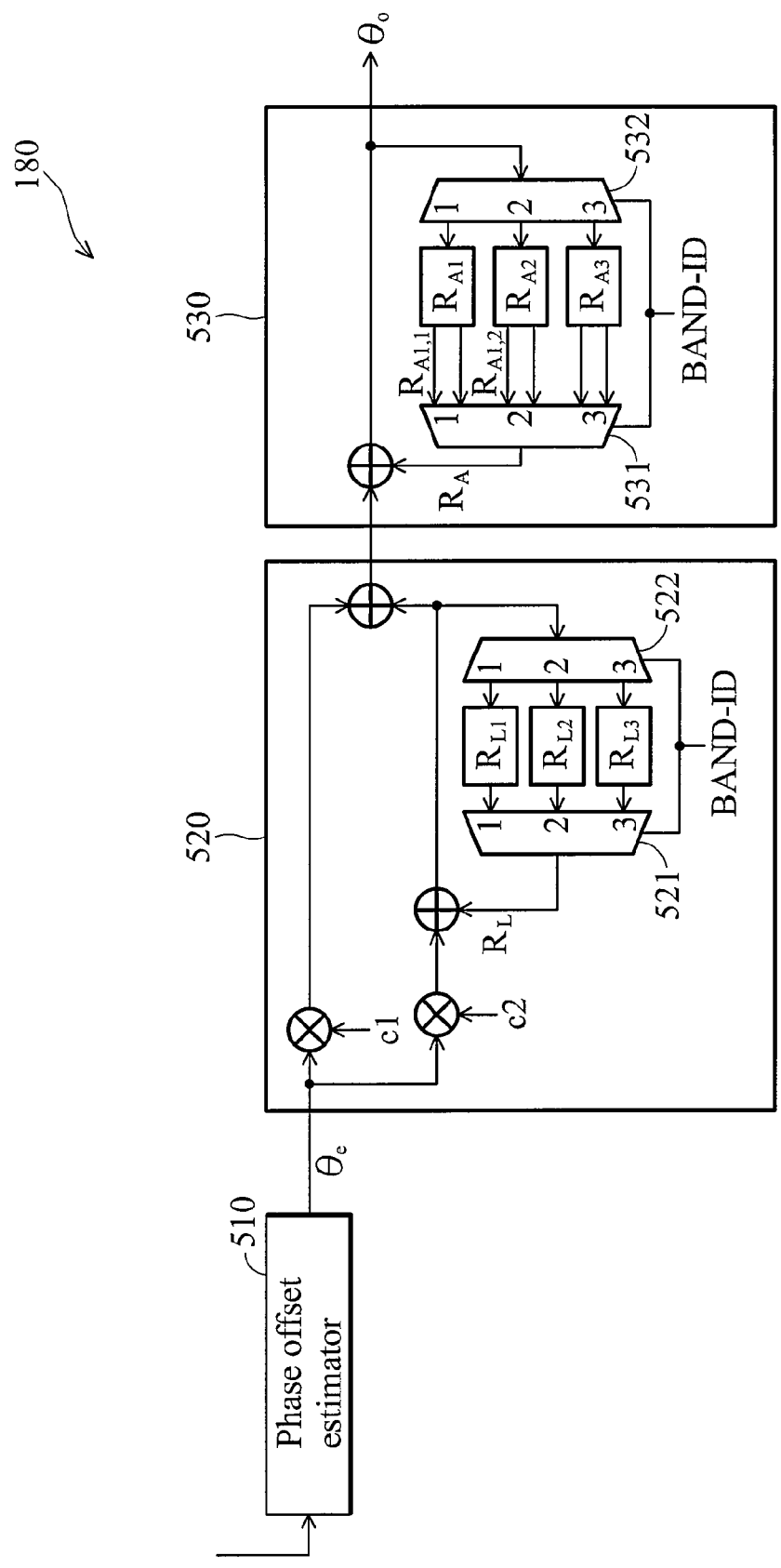
FIG. 5 shows a block diagram of the phase offset tracking module for MB-OFDM system in FIG. 1.

Please refer to FIG. 5. FIG. 5 shows a block diagram of the phase offset tracking module 180 in FIG. 1. The key difference with the previous embodiments is that there are multiple loop and accumulator registers which are responsible for different bands. The phase offset estimator 510 estimates the error phase $\theta_e$ corresponding to each symbol. The loop filter 520 and the accumulator 530 further comprise multiplexers (MUX) 521 and 522, and multiplexers 531 and 532. These multiplexers always select proper register values $R_L$ and $R_A$ corresponding to the current band (e.g. BAND_ID_1, BAND_ID_2, or BAND_ID_3) when switching bands. For example, if the current band is BAND_ID_1, these multiplexers select $R_{L1}$ and $R_{A1}$ as register values $R_L$ and $R_A$ to solve the phase jumping phenomenon that occurs in band switching.

Figure 6:
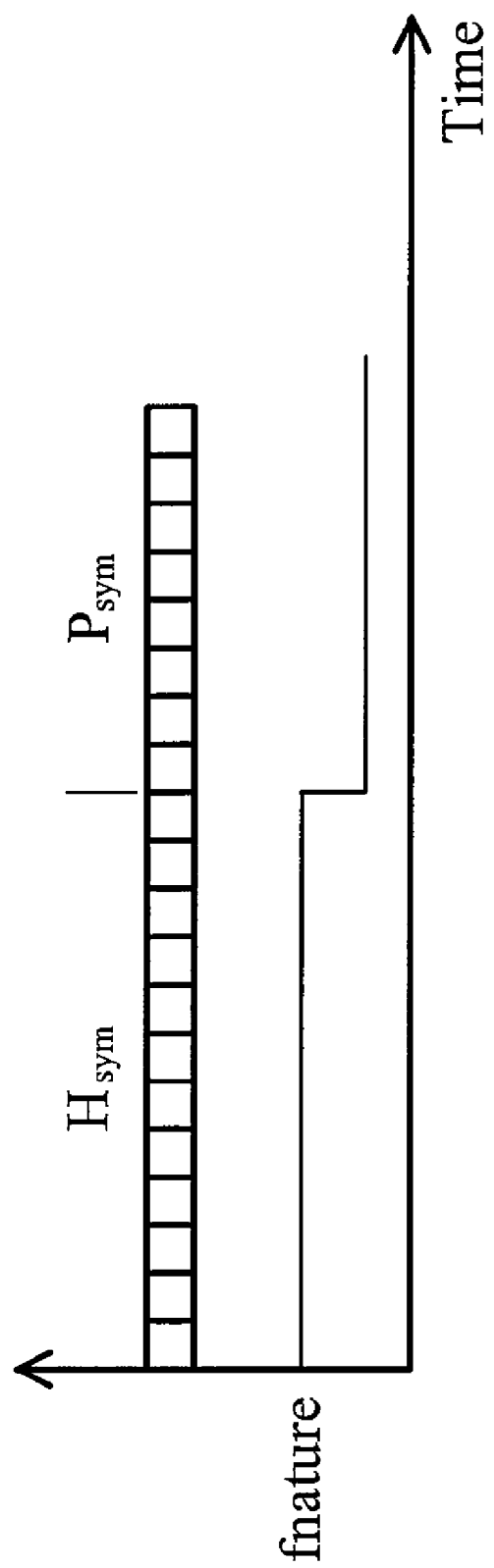
FIG. 6 shows a timing diagram of the natural frequency variation according to a third embodiment.

Please refer to FIG. 6. FIG. 6 shows a timing diagram of the natural frequency (change according to the values of coefficients C1 and C2) variation according to a third embodiment. When the current received symbol is header symbol $H_{sym}$, the natural frequency $f_{nature}$ is set to high and used in acquisition stage. When the current received symbol is payload symbol $P_{sym}$, the natural frequency $f_{nature}$ is set to low and used in tracking stage. Compared with the related art, the two-level natural frequency of the DPLL meets the requirement of residual phase offset in specific transmission modes to improve the performance.

Figure 7A:
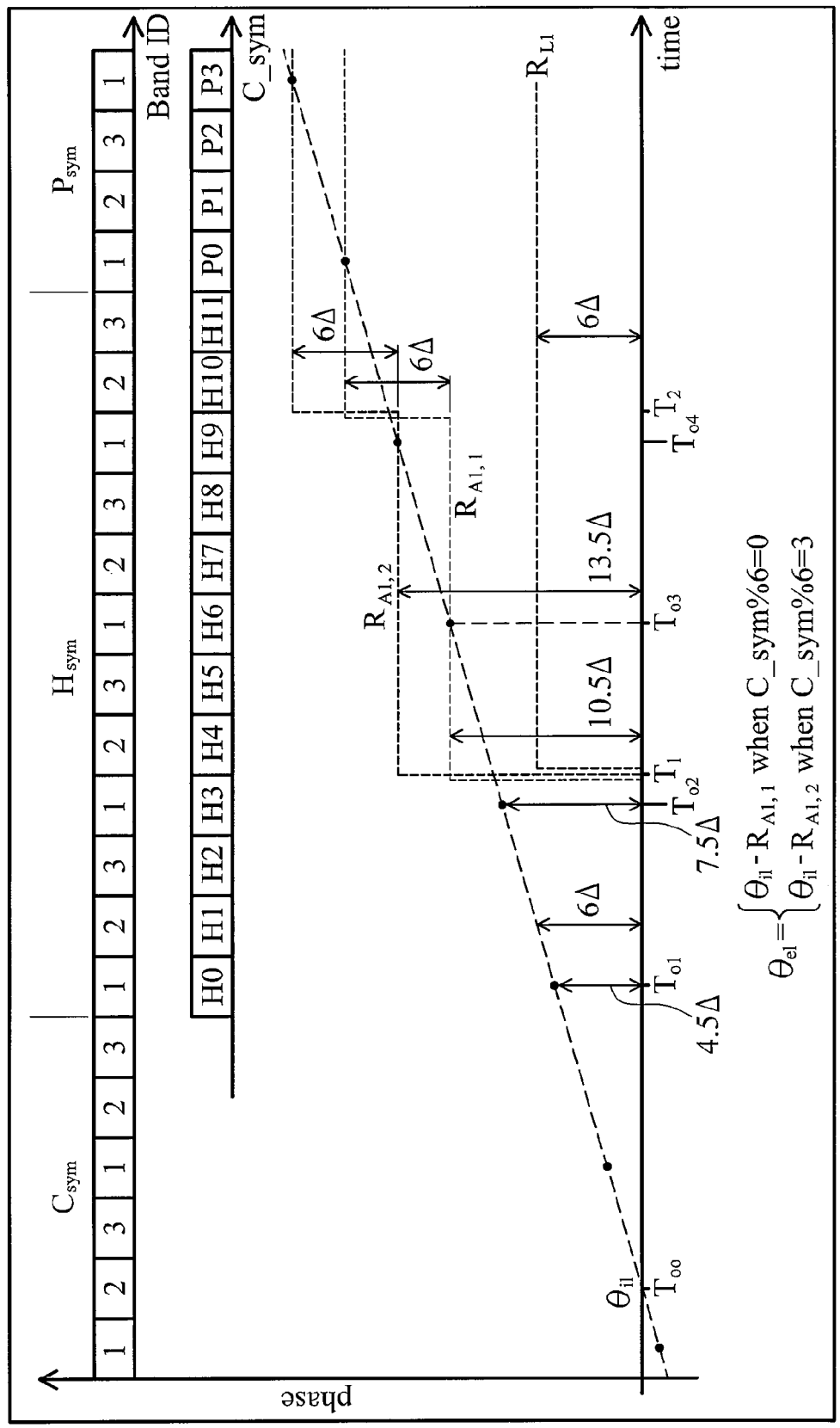
FIG. 7A show timing diagrams of updating the register values $R_A$ and $R_L$ with different TFC numbers according to a fourth embodiment.
Figure 7B:
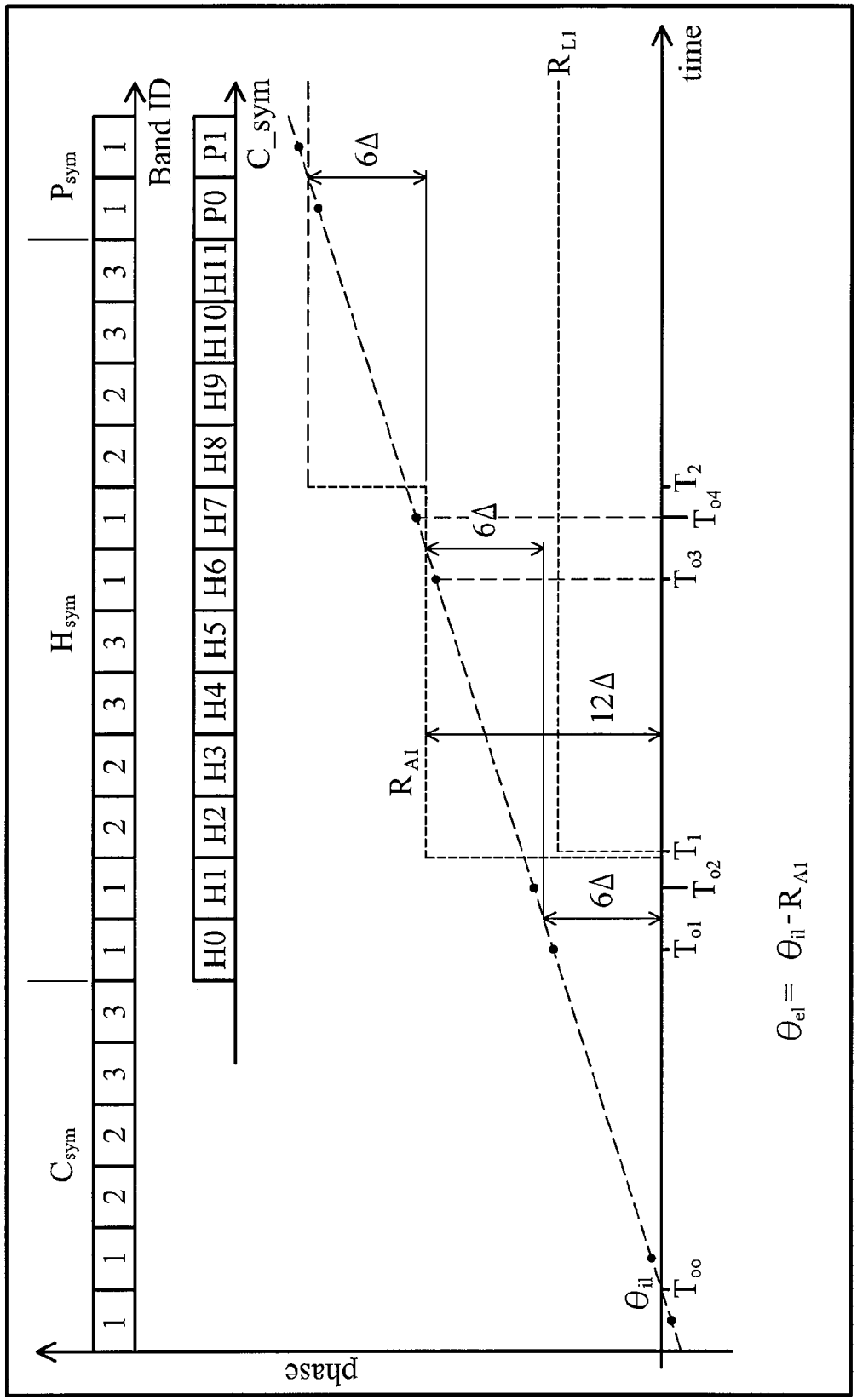
FIG. 7B show timing diagrams of updating the register values $R_A$ and $R_L$ with different TFC numbers according to a fifth embodiment.

Please refer to FIG. 7A and FIG. 7B at the same time. FIG. 7A and FIG. 7B show timing diagrams of updating the register values $R_A$ and $R_L$ with different TFC numbers according to a fourth and a fifth embodiments, respectively. Because all BAND_ID s are the same, take band BAND_ID_1 symbols as an example, the updated register values $R_{A1}$ and $R_{L1}$ are shown in FIG. 7A (TFC number=1, TFC number=3 is the same case). The error phase $\theta_{e1}$ of the band BAND_ID_1 satisfies the following formula:

$$\theta_{e1} = \begin{cases} \theta_{i1} - R_{A1,1} & \text{when C\_sym\%6 = 0} \\ \theta_{i1} - R_{A1,2} & \text{when C\_sym\%6 = 3} \end{cases}$$

Wherein $\theta_{i1}$ is the input phase of the band BAND_ID_1 symbols and $R_{A1}$ is the register value of the band BAND_ID_1. At time $T_1$, the register value $R_{L1}$ utilized in the loop filter 520 is set to $6\Delta$ by force and the register values $R_{A1,1}$ and $R_{A1,2}$ utilized in the accumulator 530 are respectively set to $10.5\Delta$ and $13.5\Delta$ by force after the first and second coming header symbols ($H_0$ and $H_3$) are processed (at time $T_{O1}$ and $T_{O2}$). At time $T_1$, the averaged estimated error phase $\theta_{e1'}$ of the band BAND_ID_1 is estimated according to the equation: $\theta_{e1',T1}=(\theta_{e1',T01}+\theta_{e1',T02})/2=\{(\theta_{i1,T01}-R_{A1,1})+(\theta_{i1,T02}-R_{A1,2})\}/2=\{(4.5\Delta-0)+(7.5\Delta-0)\}/2=6\Delta$. At time $T_2$, likes the operations of the related art, the register values $R_{A1,1}$ and $R_{A1,2}$ are accumulated naturally (equal to $16.5\Delta=10.5\Delta+6\Delta$ and $19.5\Delta=13.5\Delta+6\Delta$) and do not need to be set by force anymore (only set by force in the first time at time $T_1$ in order to reduce the convergence time). At time $T_2$, the averaged estimated error phase $\theta_{e1'}$ of the band BAND_ID_1 is estimated according to the equation: $\theta_{e1',T2}=(\theta_{e1',T03}+\theta_{e1',T04})/2=\{(\theta_{i1,T03}-R_{A1,1})+(\theta_{i1,T04}-R_{A1,2})\}/2=\{(10.5\Delta-10.5\Delta)+(13.5\Delta-13.5\Delta)\}/2=0$. A detailed description of setting the register values by force in the first time (at time $T_1$) is provided in the following.

The value $6\Delta$ utilized to set the register value $R_{L1}$ is calculated according to the first and second coming header symbols ($H_0$ and $H_3$). As shown in the figure, since the distance between $T_{o,0}$ and $T_{o,1}$ is 4.5 symbols, the input phase offset $\theta_{i1}$ of the first coming header symbol Hsym_1 is $4.5\Delta$ (at time $T_{O1}$) and the input phase offset $\theta_{i1}$ of the second coming header symbol Hsym_1 is $7.5\Delta$ (at $T_{O2}$). The value $6\Delta$ is obtained by taking average value of the first and second coming header symbols Hsym_1 ($(7.5+4.5)/2=6$). After the value $6\Delta$ is obtained, the corresponding values $10.5\Delta(2*R_{L1}-R_{L1}/4=2*6\Delta-6\Delta/4)$ and $13.5\Delta$ $(2*R_{L1}+R_{L1}/4=2*6\Delta+6\Delta/4)$ utilized to set the register values $R_{A1,1}$ and $R_{A1,2}$ are then obtained.

Please refer to 7B. Still taking band BAND_ID_1 symbols as an example, the updated register values $R_{A1}$ and $R_{L1}$ are shown in FIG. 7B (TFC number=1). The phase offset error signal $\theta_{e1}$ of the band BAND_ID_1 satisfies the following formula:

$$\theta_{e1}=\theta_{i1}-R_{A1}$$

Wherein $\theta i1$ is the phase offset input signal of the band BAND_ID_1 symbols and $R_{A1}$ is the register value of the band BAND_ID_1. At time $T_1$, the register value $R_{L1}$ utilized in the loop filter 520 is set to $6\Delta$ by force and the register values $R_{A1}$ utilized in the accumulator 530 is set to $12\Delta$ by force after the first and second coming header symbols ($H_0$ and $H_1$) are processed (at time $T_{O1}$ and $T_{O2}$). At time $T_1$, the averaged estimated error phase $\theta_{e1'}$ of the band BAND_ID_1 is estimated according to the equation: $\theta_{e1',T1}=(\theta_{e1',T01}+\theta_{e1',T02})/2=\{(\theta_{i1,T01}-R_{A1,1})+(\theta_{i1,T02}-R_{A1,2})\}/2=\{(5.5\Delta-0)+(6.5\Delta-0)\}/2=6\Delta$. At time $T_2$, the register value $R_{A1}$ is accumulated naturally (equal to $18\Delta=12\Delta+6\Delta$) and do not need to be set by force anymore (only set by force in the first time at time $T_1$ in order to reduce the convergence time). At time $T_2$, the averaged estimated error phase $\theta_{e1'}$ of the band BAND_ID_1 is estimated according to the equation: $\theta_{e1',T2}=(\theta_{e1',T03}+\theta_{e1',T04})/2=\{(\theta_{i1,T03}-R_{A1,1})+(\theta_{i1,T04}-R_{A1,2})\}/2=\{(11.5\Delta-12\Delta)+(12.5\Delta-12\Delta)\}/2=0$. A detailed description of setting the register values by force in the first time (at time $T_1$) is provided in the following.

The value $6\Delta$ utilized to set the register value $R_{L1}$ is calculated according to the first and second coming header symbols ($H_0$ and $H_1$). As shown in the figure, the input phase offset $\theta_{i1}$ of the first coming header symbol Hsym_1 is $5.5\Delta$ (at time $T_{O1}$) and the input phase offset $\theta_{i1}$ of the second coming header symbol Hsym_1 is $6.5\Delta$ (at $T_{O2}$). The value $6\Delta$ is obtained by taking average value of the first and second coming header symbols Hsym_1 ($(5.5+6.5)/2=6$). After the value $6\Delta$ is obtained, the corresponding value $12\Delta$ ($2*R_{L1}$) utilized to set the register values $R_{A1}$ is then obtained. Because the BAND_IDs are identical for TFC Number 5~7, we can use only one loop and accumulate registers and do phase tracking symbol by symbol or just use one of the two phase tracking methods described above.

Compared with the related art, the convergence time of the phase offset tracking module in the invention is much shorter due to the force setting of registers inside. Hence performance can be increased. Additionally, the phase offset tracking modules can be utilized in the OFDM receiver or the MB-OFDM receiver in different embodiments.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A phase offset tracking method for tracking a phase offset in an Orthogonal Frequency Division Multiplexing (OFDM) receiver, said OFDM receiver receiving various kinds of input symbols and compensating a phase offset in each symbol, each input symbol comprises an input phase offset, said phase offset tracking method comprising:
    receiving an input symbol;
    generating an frequency-domain symbol according to the input symbol;
    generating an estimated error phase according to the frequency-domain symbol;
    utilizing a first and a second registers to respectively store a first and a second register values;
    setting the first and second register values initially according to the estimated error phase;
    filtering the estimated error phase to generate a filtered signal according to the first register value; and
    accumulating the filtered signal continuously according to the second register value to generate an output phase for compensating an input phase offset in each input symbol;
    wherein the step of setting the second register value further comprises:
        setting the second register value to be twice of the unit phase error initially to compensate the phase offset in a second coming input symbol after a first coming input symbol is processed.

2. The phase offset tracking method according to claim 1, wherein the step of compensating the phase offset in each input symbol further comprises:
    compensating the phase offset in a first coming header symbol or further more symbols after an operation of frequency domain equalizer by the estimated error phase.

3. A phase offset tracking method for tracking a phase offset in a Multi-band Orthogonal Frequency Division Multiplexing (MB-OFDM) receiver, said MB-OFDM receiver receiving various kinds of symbols corresponding to different bands and compensating the phase offset in each symbol, said phase offset tracking method comprising:

receiving an input symbol;

generating an frequency-domain symbol according to the input symbol;

generating an estimated error phase according to the frequency-domain symbol;

utilizing a first and a second registers to respectively store a first and a second register values;

setting the first and second register values initially according to the estimated error phase in different bands;

filtering the estimated error phase to generate a filtered signal according to the first register value;

accumulating the filtered signal continuously according to the second register value to generate an output phase for compensating an input phase offset in each input symbol;

wherein the step of utilizing a first and a second registers further comprises:

utilizing a first multiplexer to select the first register value of a current band; and utilizing a second multiplexer to select the second register value of a current band.

4. The phase offset tracking method according to claim 3, wherein the step of setting different first register values further comprises:

setting the first register value of a first band to an average of the first and second coming header symbols of the first band as the unit phase error of the first band;

setting the first register value of a second band to an average of the first and second coming header symbols of the second band as the unit phase error of the second band;

setting the first register value of a third band to an average of the first and second coming header symbols of the third band as the unit phase error of the third band;

wherein there are three bands in the MB-OFDM receiver.

5. The phase offset tracking method according to claim 4, wherein the step of setting different second register values further comprises:

setting different second register values of different bands to be twice of the unit phase errors of different bands initially to compensate different phase offsets in different second coming input symbols of different bands after different first coming input symbols in different bands are processed.

\* \* \* \* \*